April 14, 1964 C. C. DALY 3,129,386
AUTOMATIC ANTENNA IMPEDANCE MATCHING AND LOADING UNIT
Filed May 21, 1962
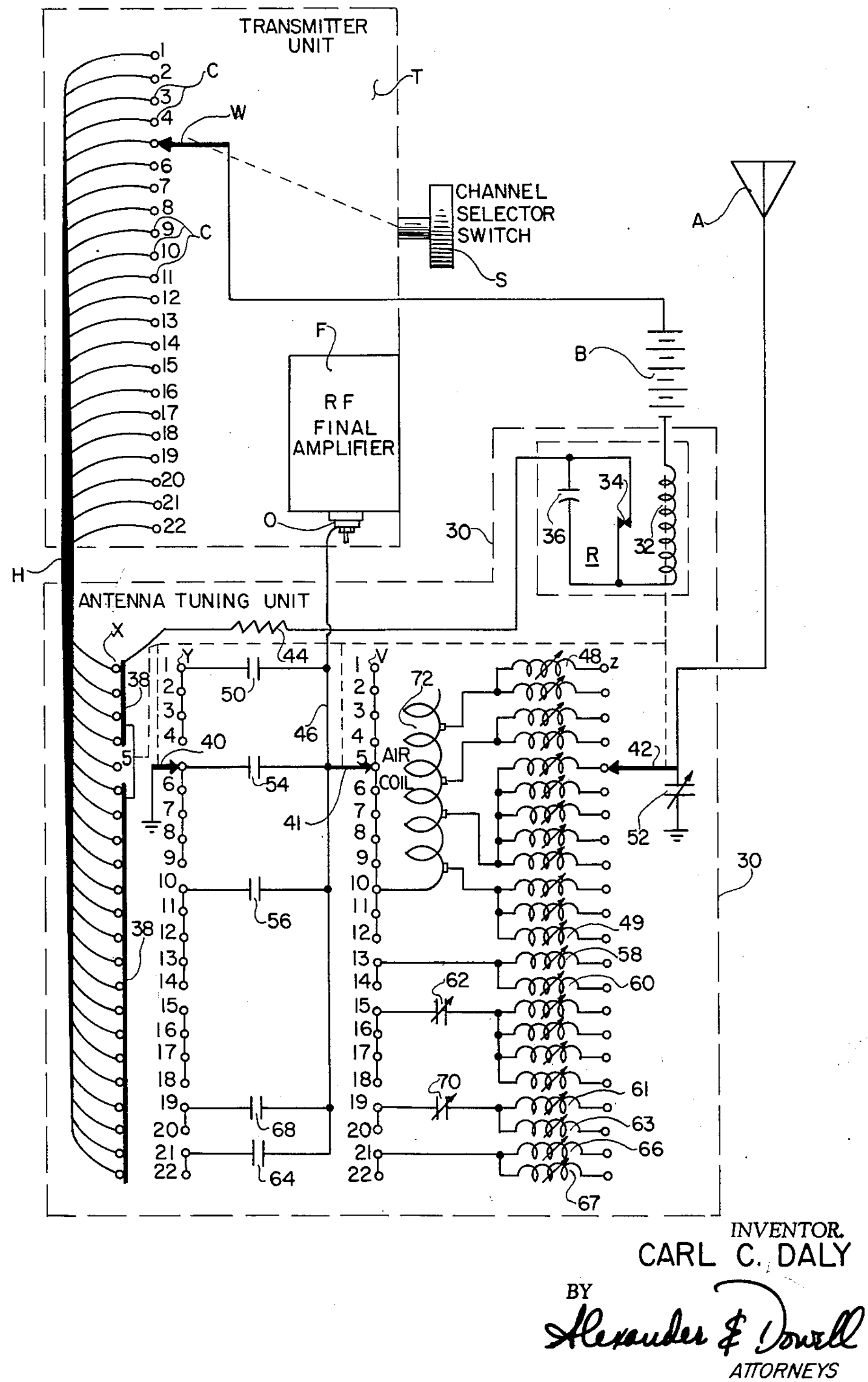
INVENTOR.
CARL C. DALY
BY Alexander & Dowell
ATTORNEYS United States Patent Office 3,129,386
Patented Apr. 14, 1964

3,129,386
AUTOMATIC ANTENNA IMPEDANCE MATCHING AND LOADING UNIT

Carl C. Daly, Fort Lauderdale, Fla., assignor to Sunair Electronics, Inc., a corporation of Florida
Filed May 21, 1962, Ser. No. 196,234
5 Claims. (Cl. 325—174)

This invention relates to automatic antenna loading systems for use with channel-switching transmitters having preset and fixed frequency channels within a rather large range of frequencies.

It is an object of this invention to provide an improved antenna matching and loading unit, especially adapted for use in connection with airborne and marine vehicles, the improved unit being small and light-weight and consuming only a minimum amount of power when switching from one channel to another, such switching being done at a high rate of speed commensurate with the switching rate of the transmitting equipment itself.

It is a more specific object of the present invention to provide an antenna loading unit having a plurality of separate pretuned and locked antenna matching circuits, one for each transmitter channel, and having stepping switch actuator means slaved to a similar switch deck in the transmitter which is part of the main channel-selecting switch so that the particular antenna matching circuit corresponding with the channel selected at the transmitter is always automatically and substantially instantaneously inserted between the transmitter and the antenna. This slaved stepping switch actuator means is a considerable improvement over prior-art automatic antenna loading systems which use servo mechanisms to tune the individual components of the antenna matching network and which are relatively complicated in that they require servo amplifiers operated by complex sensing means, and are generally of the type which cannot be pretuned at the factory to match particular antennas. In the present loading unit, the only moving part is the stepping switch itself which selects the appropriate antenna matching network circuit.

It is another important object of the present invention to provide an antenna loading unit which matches the output characteristic impedance of the transmitter to a single antenna whose length has been predetermined and cut to ¼ wave length at some point within the frequency band to be tuned. The antenna loading unit automatically inserts the proper impedances to couple this fixed antenna to the output impedance of the transmitter regardless of which one of a plurality of channels is selected. The present antenna loading unit uses the general approach suggested in Patent 2,430,173 wherein the loading unit inserts the required network impedance in series between the output of the transmitter and the fixed antenna so as to provide antenna matching to ¼ wave length resonance on all frequencies at or below the quarter-wave physical length of the antenna itself, or so as to tune the antenna to an odd multiple of a ¼ wave length when a transmitter channel is selected having a frequency greater than the frequency at which the antenna is physically resonant at ¼ wave length. Each of the tuned matching network so the present unit when taken with the input capacity of the antenna actually comprises a conventional pi-network made up of preset impedance by means of padding capacitors and permeability-tuned inductances.

The present novel system is being used in combination with commercial airborne transmitting equipment in connection with which a practical example will be hereinafter described to illustrate the present disclosure, this particular airborne transmitting equipment being tunable at one of 22 channels within the frequency range of 2–18 megacycles, the transmitter having an output characteristic impedance of 52 ohms, and the aircraft fixed antenna having a physical length of 34 feet and being tuned to ¼ wave length resonance at approximately the center of the above frequency range. When installed in light fixed wing aircraft, this invention has an input capacitance of approximately 80 micromicrofarads.

It is an object of the present invention to provide an antenna tuning unit employing a plurality of network circuits each of which comprises a conventional pi matching network when taken with said 80 micromicrofarad capacity of the antenna, and the present tuning unit also including a trimmer capacitor across the input capacity of the antenna itself so that the latter can be adjusted to bring the capacity of the antenna to a predetermined value, regardless of small variations in the actual capacity of the antenna in a particular installation. It is an important advantage of the invention that when this type of tuning unit is used, all 22 of the pi matching networks can be fixed tuned at the factory so that when installed in an aircraft having the above mentioned type of antenna, it is only necessary to adjust the single trimmer capacitor across the input capacity of the antenna in order to have the entire system accurately tuned and ready for use.

It is another important object of this invention to provide an antenna matching unit having a stepping switch and actuator comprising the only moving parts, and having all of the other elements of the tuning unit factory-adjusted and locked whereby the unit during switching from one channel to another, and over the life of the unit, will provide accurate results having substantially perfect constancy, whereby reliable communications can be had at all times.

Other objects and advantages of the invention will become apparent during the following discussion of the drawing, which is a schematic diagram illustrating an antenna tuning unit coupling the final amplifier of a transmitter with a fixed antenna and having network switching means slaved to the channel selector switch within the transmitter unit, whereby the fixed network impedances are always promptly selected so as to match the antenna to the characteristic impedance of the final amplifier for whichever transmitter channel is selected.

Referring now specifically to the drawing, a transmitter unit T is illustrated having a final RF amplifier F and having a channel selector switch S coupled to tuned tank circuits (not shown) of the trnsmitter so as to change from one transmitting channel to another in a manner well known per se in the prior art. The channel selector switch is also shown mechanically linked to the wiper W of a 22-channel selector switch, the purpose of which will be hereinafter discussed. An antenna tuning unit 30 couples the final amplifier F with a fixed antenna A which is of such physical length as to exhibit ¼ wave length resonance at some frequency within the overall frequency range which the transmitter is capable of covering.

The antenna tuning unit is contained within a housing 30, and includes four decks of switches, which decks are labeled V, X, Y and Z at the tops of the vertical rows of contacts, which likewise include 22 contacts each corresponding with one of the contacts C of the switch deck in the transmitter unit. Each of the contacts 1 through 22 of the switch deck X not only corresponds with one of the contacts of the switch deck shown in the transmitter unit, also numbered 1 through 22, but contacts in these two decks bearing the same numbers are all connected together by a wiring harness H schematically shown in the drawing. In other words, the top contact in switch deck X is connected with the top contact C of the switch deck in the transmitter unit, and so on down the line through the 22 contacts.

An actuating means comprising a stepping relay R is included in the antenna tuning unit and includes a stepping switch solenoid 32 which is connected with series contacts 34, which contacts are protected by a capacitor 36 connected thereacross in a manner well known per se. Such stepping switches are commercially available, and therefore it is not believed necessary to go into the details thereof, but the solenoid includes a plunger (not shown) which is schematically represented by the mechanical operator dashed-lines leading from the solenoid 32 to the wipers 38, 40, 41 and 42 of the four switch decks V, X, Y and Z. The wipers 38, 40, 41 and 42 always move in step with each other, and in fact are mechanically coupled together by a common shaft (not shown), and each time the plunger within the solenoid 32 is actuated, the contacts 34 are reclosed in a manner well known per se, so that the stepper will continuously advance the wipers 38, 40, 41 and 42 until the supply of power to the solenoid 32 is interrupted externally of the unit. This power is furnished by a battery B, which can be part of the aircraft electrical system and this battery is connected in series between the transmitter switch wiper W and the wiper 38 of the switch deck X and the solenoid winding 32 of the stepper relay assembly R which is intermittently energized through the contacts 34 and through a circuit which includes a current limiting resistor 44.

The stepping switch system operates as follows: When the transmitter channel selector is moved to a new position to select a different channel from that to which the transmitter and the antenna tuning unit are then tuned, the stepping relay R is set in motion and advances all four of the wipers 38, 40, 41 and 42 step by step and always in the same direction. For example, if the channel selector S in the transmitter T sets the wiper W at contact position 5 as shown in the drawing, the stepper R will advance the wipers 38, 40, 41 and 42 in unison until the gap between the upper and lower sections of the wiper 38 reaches wiper position 5, as illustrated. In other words, the switch deck X is of the type having a wiper which makes contact with all except one of the 22 contacts, and therefore current can pass from the battery through the wiper W through the wire of the harness H joining contact 5 of the transmitter with contact 5 of the switch deck X, and if the wiper 38 is in some other position than in position 5, current will pass through the contact 5, through the wiper 38, and finally through the limiting resistor 44 and into the stepping relay R, thereby providing continuous ratchet-type advancement of the stepping relay R. The wipers 38, 40, 41 and 42 are thus advanced until the gap in the wiper 38 lies opposite the contact 5 of the deck X, whereupon the current is broken to the stepping relay R which then steps in this selected position. By this means any position selected for the wiper W by the channel selector S of the transmitter unit is automatically duplicated by the stepping switch in the manner just described. Incidentally, once the proper channel has been selected no further current is drawn by the stepping relay R until the channel selector S of the transmitter is changed to move the wiper W to a different contact position.

The output of the final RF amplifier F is connected by a suitable transmission cable from the output insulator 0 of the RF amplifier to a busbar 46 comprising the input terminal of the matching network section of the antenna tuning unit 30. This busbar 46 is the input point of the network and connects to capacitor elements 50, 54, 56, 64 and 68 extending leftwardly toward the row of contacts Y cooperating with wiper 40 which grounds the selected one of said capacitor elements to form the input shunt leg of the pi-matching network for coupling to the antenna A. The busbar 46 is also connected to wiper arm 41 of the switch deck V having contacts 1–12 connected with a tapped series inductor 72, and having contacts 13—14 connected directly to inductors 58 and 60. The contacts 15–18 are connected to a capacitor 62; the contacts 19—20 are connected to a capacitor 70; and the contacts 21—22 are connected to series inductors 66 and 67. In other words, the circuits located on the drawing between the row of contacts V and the row of contacts Z comprise in the various switch positions different values for the series leg of the pi-network.

As shown on the present drawing, the upper contacts of all of the switch decks tune to the lower frequencies within the 2–18 megacycle tuning range of the transmitter, and the lower switch contacts tune to the upper frequency ranges. Note also that there are several circuits, for instance in positions 15–18 and in positions 19—20, in which the capacitors 62 and 70 appear in the series leg of the network to allow greater flexibility of adjustment for precise matching of the antenna to the RF amplifier where the values of series inductance in the network are very small.

Each of the series inductances connected to the terminals of the switch deck Z is permeability-tuned by an adjustable slug which can then be locked in any desired position after it has been tuned. In position 1, the pi-network comprises in its series leg the inductance 48 and part of the inductance 72, is the input shunt leg the capacitor 50 to ground, and in the output shunt leg the adjustable trimmer condenser 52 and the wiper 42 comprising the output terminal of the matching unit. From position 1 to position 12, differently tuned inductances are provided in the network in the series leg of the pi, but in these various positions different slug tuned coils such as 48 and 49 are selected and different shunt-leg capacitors 50, 54 and 56 are connected to ground depending on the switch position. The capacitor 54 will be of lesser capacity than capacitor 50 because of the fact that the frequency is increasing as the switch wipers 41 and 42 move downwardly. The same capacitor 56 is used in position 10, 11 and 12 of the switch decks Y and V and in positions 13 and 14, but in positions 15–18 no shunt capacitor is used. Also in positions 19 and 20 differently tuned inductances, such as the inductances 61 and 63, are employed in series with a variable capacitor 70, and still a smaller value of shunt input capacitor 68 is used. In positions 21 and 22 the shunt capacitor 64 is even smaller and cooperates with one of two slug tuned inductances 66 and 67 in the series leg. In all these positions, however, the output shunt leg is the same, with respect to capacitance to ground, furnished by the input capacity of the antenna A and the trimmer capacitor 52, totaling about 80 micromicrofarads.

The reason why some of the series legs include only inductances such as 72, 48, 58, 60 or 66, whereas others of the series-leg impedances also include capacitors such as the capacitors 62 and 70, lies in the changing characteristics of the antenna input impedance with change in frequency, remembering for the moment that the antenna is fixed in its physical dimensions and is not altered during tuning of any of these channels. For instance, if the physical length of the antenna A is such that it is resonant at 8 megacycles, it would result that for frequencies below 8 megacycles, such as in switch positions 1–12, inductances would have to be included in the series-leg of the pi-network, but in positions 15–20 at a frequency above the frequency for which the antenna is ¼ wave length resonant, capacity would have to be used in the series leg of the network. This holds true until another odd multiple of ¼ wave length resonance is approached, and then the antenna input characteristic again reverses as in positions 21 and 22 and requires inductance in the series leg of the network instead of capacity.

Thus it will be seen that when the stepping switch relay R steps the wiper 38 around to bring it into step with the position of the wiper W in the transmitter unit, there result simultaneous changes in the impedance values of the pi-network because of simultaneous changes in the positions of the wipers 40, 41 and 42 whereby different preset impedances are selected and placed in the pi-network to effectively couple the antenna A to the output impedance of approximately 52 ohms of the RF final amplifier F.

I do not limit my invention to the exact form shown in the drawing for obviously changes may be made therein within the scope of the claims.

I claim:

1. In combination, a radio-frequency transmitter unit having first switch means for selecting one of a number of preset channels within a wide frequency range; an antenna comprising a quarter wave-length resonant load at one frequency within said range; and an antenna coupling and matching unit interposed between the antenna and the transmitter unit and including a plurality of preset antenna coupling and matching networks, each matching the antenna to the transmitter unit at the frequency of one of the channels for quarter-wave resonance below said one frequency and for a multiple of one quarter-wave length above said one frequency, and the matching unit including second switch means having positions corresponding with those of the first switch means for selecting one of said networks and connecting it between said transmitter unit and said antenna, and the matching unit including electrically operated step-by-step slave actuator means for controlling said second switch means to move the latter to the same channel as selected by the former, a source of power, and electric circuit means coupled with the switch means and with the source and with the actuator means for connecting the source to the actuator means whenever the first and second switch means are set on different channels.

2. In a combination as set forth in claim 1, said networks comprising series and shunt pi-network branches including plural impedance elements selected for interconnection to form a coupling network by said second switch means; and said impedance elements being separately adjustable to fixed preset values.

3. In combination, a transmitter having channel-switching means including first switch means for selecting one of a number of preset channels within a wide frequence range and including a contact for each channel, a transmitter load; a plurality of preset load coupling and matching networks; second switch means having a contact for each channel and each connected with the corresponding contact of the first switch means, and having other contact means for selecting one of said networks and connecting it between said transmitter and said load; and step-by-step slave actuator means connected for controlling said second switch means to move the latter to the same channel as selected by the former, said actuator means comprising solenoid means for stepping the second switch means around, a source of power connected to wiper means on the first switch means and coupled thereby to the one contact of the transmitter channel-switching means corresponding with the channel selected and the source being through this contact to the solenoid means through a wiper on the second switch means, this latter wiper contacting in every position all of the contacts of the second switch means except the contact corresponding with the position to which the second switch means is instantaneously tuned.

4. In a combination as set forth in claim 3, said networks comprising series and shunt pi-network branches including plural impedance elements selected for interconnection to form a coupling network by said second switch means; and said impedance elements being separately adjustable to fixed preset values.

5. As an article of manufacture, a matching unit for matching a fixed antenna to a multiple channel transmitter covering a wide frequency range, comprising in said unit input and output terminals; a plurality of adjustable impedance elements; switch means having positions corresponding with each of said channels for selectively interconnecting some of said elements to form a pi-network between said terminals pre-adjusted to match said antenna to the transmitter at the frequency of the channel selected; and electrically operated step-by-step actuator means operatively connected to said switch means to step said switch means from channel to channel when energized.

References Cited in the file of this patent

UNITED STATES PATENTS

| | | |
|---|---|---|
| 1,502,460 | Clark | July 22, 1924 |
| 1,923,305 | Gebhard | Aug. 22, 1933 |
| 2,505,511 | Vogel | Apr. 25, 1950 |